United States Patent Office 3,642,770
Patented Feb. 15, 1972

3,642,770
STEROID GLYCOSIDES AND PROCESS FOR PREPARING THEM
Werner Haede and Ulrich Stache, Hofheim, Taunus, Werner Fritsch, Neuenhain, Taunus, and Kurt Radscheit, Kelkheim, Taunus, Germany, assignors to Farbwerke Hoechst Aktiengesellschaft vormals Meister Lucius & Bruning, Frankfurt am Main, Germany
No Drawing. Filed Mar. 25, 1969, Ser. No. 810,358
Claims priority, application Germany, Apr. 6, 1968, P 17 68 165.1
Int. Cl. C07c 173/00
U.S. Cl. 260—210.5                              10 Claims

ABSTRACT OF THE DISCLOSURE

Steroid glycosides of the formula

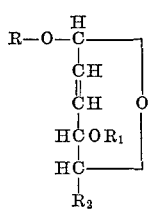

useful for the treatment of cardiac and renal diseases, wherein R is a steroid group of the 3-hydroxy-cardenolide or 3-hydroxybufadienolide series, $R_1$ is aliphatic or aromatic acyl, and $R_2$ is hydrogen, methyl, ethyl, or

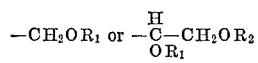

and methods of making the same by reacting a steroid alcohol ROH, with a glycal of the formula

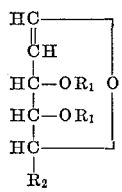

The present invention relates to steroid glycosides and to methods of making the same.

It is already known to react steroid alcohols with acylated halogeno-sugars to obtain acylated glycosides. The realisation of this reaction, however, is very cumbersome and leads even in favorable cases to yields of only 40% of the theory.

Now, we have found that steroid glycosides of the general Formula I

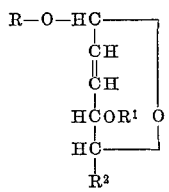

in which R represents a steroid group of the 3-hydroxycardenolide or 3-hydroxy-bufadienolide series, $R^1$ represents an aliphatic or aromatic acyl group and $R^2$ represents hydrogen atom, a methyl or ethyl group or the groups $CH_2OR^1$ or $CHOR^1$—$CH_2OR^1$, can be obtained in almost quantitative yield by reacting steroid alcohols of the formula

R—OH in which R has the meaning given above, with acylated 1,2-glycals of the Formula II

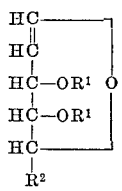

in which $R^1$ and $R^2$ have the meanings given above, in the presence of acid catalysts. If desired, the products so obtained are hydrolyzed. The reaction is connected with the separation of 1 mol of water.

As steroid alcohols, there may be used, for example, the following cardenolides or bufadienolides:

Digitoxigenin, gitoxigenin, digoxigenin, periplogenin, uzarigenin, canarigening, k-strophanthidine, scillarenin, bufalin, androst - 5 - ene - 3β - ol-17β-yl-α-pyrone and androst-5-ene-3β-ol-17β-yl-butenolide.

The acylated 1,2-glycals may be prepared according to Ber. dtsch. chem. Ges. 47, 196 (1914). There may be used, for example, the acylated arabinals, xylals, glucals, galactals, allomethylals or rhamnals. As aliphatic acyl groups $R_1$, there may be used in particular lower acyl groups such as the formyl, acetyl or propionyl groups; as aromatic acyl groups, there may be used the benzoyl group which may also be substituted, for example the nitro benzoyl group. As solvents, there may be used ethers such as ethyl ether, tetrahydrofuran and dioxane and other inert solvents, for example dimethylformamide or acetone. The reaction is effected at temperatures in the range of from 0° C., to the boiling temperature of the solvent, preferably at room temperature. As acid catalysts, there may be used mineral acids, sulfonic acids or phosphorus oxylchloride. The reaction times range from some minutes to several hours.

Workng up is suitably effected by neutralisation and concentration of the solution, subsequent precipitation of the reaction product with water and, if necessary, subsequent hydrolysis with weak alkalis.

The products of the present invention are valuable pharmaceuticals which are distinguished for example, by inotropic, cardiovascular, diuretic and anti-diarrheal properties and by an increased solubility in water. They are, therefore, especially suitable for the treatment of cardiac and renal diseases.

Thus, for example, the digitoxigenin - 3-[2'-desoxy-3' (2')-anhydro-L-rhamnoside] prepared according to the process of the present invention is twice as active as the known digitoxin in the test on the isolated left atrium of a Guinea pig's heart (=test I) and in the potassium excretion test on an isolated Guinea pig's heart according to Langendorff (=test II).

Test I: 2.5γ of the above-mentioned compound have the same activity as 5γ digotoxin.

Test II: 1.5γ of the mentioned compound correspond to 3γ of digitoxin with regard to potassium excretion.

Furthermore, the mentioned compound has, with high oral resorption, an essentially smaller cumulation rate (=higher fading quota) than digitoxin. For example, after intraduodenal administration to a dog, the action of the compound has completely faded away after 16 hours, whereas the action of a corresponding dose of digitoxin persists for 40 hours. The maximum of the action is reached with the above-mentioned substance after only 90 minutes. Until this time, about 70% of the dose administered is resorbed.

Another therapeutical advantage of the invention compound over digitoxin is that toxic effects on the cardiac action which may occur after administration of an overdose of the preparation disappear very rapidly (in about 30 minutes), whereas the same effects caused by administration of digitoxin are maintained for many hours and may even cause death. With the preparation of the invention, therefore, the risk of an overdose is essentially smaller than with digitoxin.

The products of the invention are preferably administered orally, in the form of tablets or dragées.

The following examples illustrate the invention but they are not intended to limit it thereto:

EXAMPLE 1

Digitoxigenin-3-[2′-desoxy-2′,3′-anhydro-D-glucoside-4′,6′-diacetate]

300 mg. of digitoxigenin were stirred for 5 hours at room temperature in 2.25 ml. of tetrahydrofuran with 300 mg. of triacetyl-D-glucal and one droplet of phosphorus oxychloride. The reaction solution was then combined with 0.2 ml. of pyridine and evaporated almost to dryness under reduced pressure, combined with water and filtered with suction. An amorphous product was obtained in almost quantitative yield which showed infrared peaks at 1020, 1230, 1615, 1730 and 3460 cm.$^{-1}$, and $\epsilon_{max}$ (217 m$\mu$): 15,000.

In analogous manner, there were obtained:

(a) the 2′-desoxy-2′,3′-anhydro-glycoside-4′,6′-diacylates of gitoxigenin,
(b) the 2′-desoxy-2′,3′-anhydro-glycoside-4′,6′-diacylates of digoxigenin,
(c) the 2′-desoxy-2′,3′-anhydro-glycoside-4′,6′-diacylates of periplogenin,
(d) the 2′-desoxy-2′,3′-anhydro-glycoside-4′,6′-diacylates of azarigenin,
(e) the 2′-desoxy-2′,3′-anhydro-glycoside-4′,6′-diacylates of canarigenin,
(f) the 2′-desoxy-2′,3′-anhydro-glycoside-4′,6′-diacylates of k-strophanthidin,
(g) the 2′-desoxy-2′,3′-anhydro-glycoside-4′,6′-diacylates of canarigenin,
(h) the 2′-desoxy-2′,3′-anhydro-glycoside-4′,6′-diacylates of bufalin,
(i) the 2′-desoxy-2′,3′-anhydro-glycoside-4′,6′-diacylates of androst-5-ene-3β-ol-17β-yl-α-pyrone, and
(k) the 2′-desoxy-2′,3′-anhydro-glycoside-4′,6′-diacylates of androst-5-ene-3β-ol-17β-yl-butenolide, the diacetates being especially preferred.

EXAMPLE 2

Digitoxigenin-3-[2′-desoxy-2′,3′-anhydro-D-glucoside]

225 mg. of digitoxigenin-2′-desoxy-2′,3′-anhydro-D-glucoside-4′,6′-diacetate in 2.25 ml. of methanol were combined with 105 mg. of potassium bicarbonate in 1.05 ml. of water and the whole was heated for 15 minutes under reflux and under an atmosphere of nitrogen. After concentration of the reaction solution under reduced pressure and separation by filtration with suction of the precipitate, there was obtained in almost quantitative yield the glycoside melting at 240–245° C.

EXAMPLE 3

Digitoxigenin-3-[2′-desoxy-2′,3′-anhydro-L-rhamnoside-4′-acetate]

A solution of 1.1 g. of digitoxigenin in 9.6 ml. of absolute tetrahydrofurane was combined with 1.8 ml. of diacetyl-L-rhamnal and 0.07 ml. of phosphorus oxychloride. After 5 hours stirring at 20–25° C. (heating of the reaction mixture to temperatures exceeding 40° C. should be avoided, because undesired by-products are then formed which are difficult to eliminate and deteriorate the yield), the reaction mixture was poured into 50 ml. of water which contained an excess of NaHCO$_3$, the solution was extracted exhaustively with chloroform, the extracts were washed with water, dried and the solvents were removed by distillation under reduced pressure. About 2.5 g. of oil remained as residue which crystallized slowly after trituration with ether. The crystals were then filtered off and washed with a small amount of cold ether. 1.01 g. of digitoxigenin-3-[2′-desoxy-2′,3′-anhydro-L-rhamnoside-4′-acetate] melting at 137–140° C. (Kofler block) were obtained.

Characteristic infrared bands: 3515, 1780, 1750, 1735, 1615, 1230, 1020, 740 cm.$^{-1}$ (in KBr).

Ultraviolet spectrum (methanol): λ max.=216–217 m$\mu$; $\epsilon$=16,600.

EXAMPLE 4

Digitoxigenin-3-[2′-desoxy-2′,3′-anhydro-L-rhamnoside]

In order to hydrolyze the 4′-acetate group, 0.99 g. of the crystallized reaction product thus obtained was dissolved in 32 ml. of methanol and combined, at the boiling temperature, with a solution of 297 mg. of potassium bicarbonate in 2.97 ml. of water. The reaction mixture was boiled for 20 minutes under reflux, then cooled to 20° C. and poured onto 225 ml. of semi-saturated aqueous solution of sodium chloride, whereupon a crystalline product separated. After standing for 16 hours, the crystalline product was filtered off, washed with water and dried. 0.84 g. of digitoxigenin-3-[2′-3′-anhydro-L-rhamnoside] melting at 188–184° C. (Kofler block) was obtained; after recrystallization from a mixture of acetone, ether and n-hexane, the melting point was at 198–201° C. $[\alpha]_D^{20°} = +3.0°$ (chloroform; c.=0.5).

(Another sample prepared in analogous manner showed the value $[\alpha]_D^{20°} = +4.6°$).

Characteristic infrared bands (taken in KBr): 3500, 3400, 3040, 1800 (sometimes as shoulder), 1775, 1720, 1620–1625, 1085, 1020, 990, 735 cm.$^{-1}$.

Ultraviolet spectrum: λ max.=216–217 m$\mu$; $\epsilon$=15,100 (in methanol).

We claim:

1. A steroid glycoside of the formula

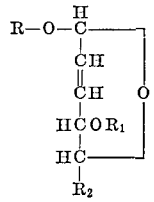

wherein R is a steroid group of the 3-hydroxy-cardenolide or 3-hydroxy-bufadienolide series, R$_1$ is lower alkanoyl, benzoyl, or nitrobenzoyl, and R$_2$ is hydrogen, methyl, ethyl,

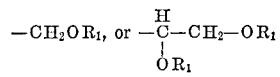

2. Digitoxigenin - 3 - [2′-desoxy-2′,3′-anhydro-D-glucoside-4′,6′-diacetate].
3. Digitoxigenin - 3 - [2′-desoxy-2′,3′-anhydro-D-glucoside].
4. Digitoxigenin - 3 - [2′ - desoxy - 2′,3′ - anhydro - L-rhamnoside-4′-acetate].
5. Digitoxigenin - 3 - [2′ - desoxy - 2′,3′ - anhydro - L-rhamnoside].
6. A steroid glycoside as in claim 1 wherein R is a digitoxigen-(3)-group and $R_1$ is alkanoyl having 1 to 3 carbon atoms.

7. The method of making a steroid glycoside of the formula

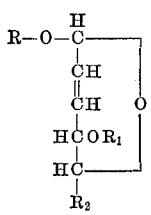

wherein R is a steroid group of the 3-hydroxy-cardenolide or 3-hydroxy-bufadienolide series, $R_1$ is lower alkanoyl, benzoyl, or nitrobenzoyl, and $R_2$ is hydrogen, methyl, ethyl, —$CH_2OR_1$, or

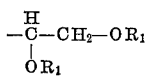

which comprises reacting a steroid alcohol of the formula ROH with an acylated 1,2 glycal of the formula

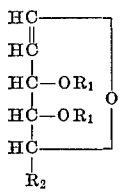

in an inert solvent at a temperature from 0° C. to the boiling temperature of the solvent in the presence of a mineral acid, a sulfonic acid, or phosphorus oxychloride as a catalyst.

8. The method as in claim 7 wherein the steroid glycoside reaction product is subsequently hydrolyzed.

9. The method as in claim 7 wherein ROH is digitoxigenin and $R_1$ is alkanoyl having 1 to 3 carbon atoms.

10. The method as in claim 9 wherein the steroid glycoside reaction product is subsequently hydrolyzed.

References Cited

UNITED STATES PATENTS 2,752,372  6/1956  Reichstein _____ 260—210.5
3,462,528  8/1969  Voigtlander et al. ___ 260—210.5

OTHER REFERENCES

Pigman, "The Carbohydrates," 1957, Academic Press Inc., New York, N.Y., pp. 399–405.

LEWIS GOTTS, Primary Examiner

J. R. BROWN, Assistant Examiner

U.S. Cl. X.R.

424—182